United States Patent [19]

Bowman et al.

[11] Patent Number: 4,685,041
[45] Date of Patent: Aug. 4, 1987

[54] RESONANT RECTIFIER CIRCUIT

[75] Inventors: Wayne C. Bowman, Rockaway; Frank M. Magalhaes, Three Bridges; Weyman B. Suiter, Jr., Whippany; Norman G. Ziesse, Chester, all of N.J.

[73] Assignee: American Telephone and Telegraph Company, AT&T Bell Laboratories, Murray Hill, N.J.

[21] Appl. No.: 894,978

[22] Filed: Aug. 8, 1986

Related U.S. Application Data

[63] Continuation-in-part of Ser. No. 710,506, Mar. 11, 1985, Pat. No. 4,605,999.

[51] Int. Cl.[4] .................... H02M 7/42; H02M 1/12
[52] U.S. Cl. ................................ 363/40; 363/47; 363/48; 363/126
[58] Field of Search ............... 363/39, 44–48, 363/126, 131, 21, 40, 97

[56] References Cited

U.S. PATENT DOCUMENTS

| | | | |
|---|---|---|---|
| 4,253,136 | 2/1981 | Nanko | 363/21 |
| 4,318,164 | 3/1982 | Onodera et al. | 363/21 |
| 4,383,292 | 5/1983 | Onodera et al. | 363/21 |
| 4,401,902 | 8/1983 | Onodera et al. | 307/415 |
| 4,449,174 | 5/1984 | Ziesse | 363/21 |
| 4,605,999 | 8/1986 | Bowman et al. | 363/19 |
| 4,607,323 | 8/1986 | Sokal et al. | 363/97 |

Primary Examiner—Patrick R. Salce
Assistant Examiner—Emanuel Todd Voeltz
Attorney, Agent, or Firm—Alfred G. Steinmetz

[57] ABSTRACT

A self-oscillating power converter utilizes a MOSFET power transistor switch with its output electrode coupled to a tuned network that operatively limits the voltage waveform across the power switch to periodic unipolar pulses. The transistor switch may be operated at a high radio frequency so that its drain to gate interelectrode capacitance is sufficient to comprise the sole oscillatory sustaining feedback path of the converter. A reactive network which is inductive at the operating frequency couples the gate to source electrodes of the transistor switch and includes a variable capacitance as a means of adjusting the overall reactance, and hence the converter's switching frequency in order to provide voltage regulation. A resonant rectifier includes a tuned circuit to shape the voltage waveform across the rectifying diodes as a time inverse of the power switch waveform. The input resistance of the rectifier is controlled so that it is invariant to frequency change within the switching frequency range of the converter but inversely proportional to the load resistance.

20 Claims, 15 Drawing Figures

RESONANT RECTIFIER CIRCUIT

This application is a continuation in part of my copending application Ser. No. 710,506 filed Mar. 11, 1985, now U.S. Pat. No. 4,605,999.

FIELD OF THE INVENTION

This invention relates to self-oscillating DC-to-DC power converters operating in the high radio frequency range; and more particularly, to the oscillating inverter, resonant rectifier circuitry and associated regulation circuitry.

BACKGROUND OF THE INVENTION

A typical switching-type power converter circuit operates by storing and releasing energy in various discrete capacitive and inductive components during each cycle of operation, where the time interval for each cycle is determined by the switching frequency. An increase in switching frequency reduces the storage time interval and the level of energy stored in reactive components during any one particular cycle of operation. In principle this increase in frequency permits reduction of both the physical and electrical sizes of magnetic and capacitive storage elements for any particular power capacity.

Inasmuch as a significant increase in operating frequency of a converter promises a significant size reduction in the circuit components on the basis of energy storage per unit volume, the fact that the switching frequency of power converters has not increased dramatically is indicative of other constraints on the increase of operating frequencies. For example, the switching speed of bipolar semiconductor switching devices is limited by charge storage, thereby limiting the benefits to be achieved from high frequency operation. MOSFET switching devices may be used in place of bipolar devices; however, their switching speeds are limited by device capacitances and parasitic lead wire inductances.

Circuit components generally include parasitic electrical parameters that produce undesirable effects at high frequencies, and considerable design effort must be expended to compensate for them. For example, at high frequencies, the parasitic inductance and resistance of a capacitor alter its effect on the circuit. The inductor's interwinding capacitance, winding resistance, and core loss also limit the maximum practical switching frequency. Circuit board layouts also contribute numerous stray capacitances, inductances, and resistances which detract from power supply performance at high frequency. Because of these complicating factors, it is extremely difficult to produce a traditional pulse width modulated switching power supply circuit that operates at frequencies much above 500 KHz.

Despite the theoretical advantages of high frequency operation of power conversion circuits, these circuits have not been practical because of the many component and design problems related to operational difficulties at very high frequencies. One high frequency power supply which surmounts these difficulties is disclosed in U.S. Pat. No. 4,449,174 issued to N. G. Ziesse on May 15, 1984 and which is assigned to the same assignee as this application. That patent discloses a high frequency resonant power converter that can operate at high radio frequencies.

That circuit was designed to benefit from the advantages of high frequency operation by using the parasitic or adjunct reactive electrical characteristics of components as positive circuit elements. The term adjunct component is used herein to mean an electrical component characteristic inherent in a device, component, or length of conductor that is often considered a deleterious parasitic component but which is fully and positively utilized in the illustrative circuit herein embodying the principles of the invention. The switching device of the power train described in the Ziesse patent referenced above is driven by a separate or independent high frequency signal source. Voltage regulation is achieved by providing a range of frequency adjustment which is adjusted either directly or by feedback means to attain a desired output voltage level. Hence, the signal source driving the power switching device must be capable of operating over a sufficiently wide band of frequencies to provide the converter with a regulated output voltage over a range of output current and input voltage that depends upon the converter's usage.

The added circuitry of a separate high frequency driver stage to drive the power switching device and provide frequency adjustment for regulation adds complexity to the converter in terms of the component count. If the drive circuit has a wide bandwidth to accommodate the frequency adjustment range, it cannot be precisely matched into the gate, and much of the drive energy is wasted. To achieve the desired high efficiency, a drive circuit must have a narrow instantaneous bandwidth and be tunable over the frequency adjustment range. A separate, tunable drive circuit, however, adds still further to circuit complexity or component count.

A further consideration of a high frequency converter circuit is the performance of the rectifier circuit. A conventional rectifier design cannot perform satisfactorily at these high frequencies of operation. The rectified waveforms of a conventional rectifier operated at high frequency tend to have ringing transients in the waveforms due to the resonances caused by parasitic inductance and capacitance. These transients serve to lower rectification efficiency and are often difficult to filter from the output signal.

Another deficiency of prior art rectifiers when operated with sinusoidal voltage and current inputs is an input impedance characteristic that varies with frequency and load to the detriment of attaining a wide range of line and load regulation. In the case of a series resonant converter that regulates by varying switching frequency to vary a power path reactive impedance, the input impedance of the conventional rectifier changes in such a way as to counteract the frequency variations utilized to achieve regulation.

SUMMARY OF THE INVENTION

The self-oscillating power train disclosed herein offers a solution to this problem in that the power switch is driven via a circuit having relatively few components and regeneratively deriving the drive power directly from the power train itself. Furthermore, its narrow tunable bandwidth permits operation at high overall efficiencies.

A self-oscillating power converter embodying the principles of the invention utilizes a MOSFET power switch (insulated gate field effect transistor) with its output electrode coupled to a tuned network that operatively limits the voltage waveform across the power switch to a fraction of a cycle of operation. The MOSFET power switch may be operated at a high enough radio frequency so that its internal (i.e., parasitic or adjunct) drain to gate capacitance is sufficient to comprise the sole oscillatory sustaining feedback path of the converter. At lower frequencies, it may be necessary to add supplementary external capacitance, however, the principle of operation remains the same.

A reactive network that is inductive at the operating frequency of the converter couples the gate to source electrodes of the MOSFET switch and includes a variable capacitance as a means of adjusting the overall inductive reactance. The variable capacitance may comprise a varactor diode arrangement whose capacitance value may be controlled by a bias voltage. Another suitable arrangement, or a directly variable inductance may be used in place of using a variable capacitance control. The converter's switching frequency is substantially controlled at a value slightly less than the resonant frequency of the inductive network in shunt connection with the gate to source interelectrode capacitance to obtain the correct phase of the feedback signal. The overall effect of the tuned circuitry connected to the MOSFET gate is to respond predominantly to the fundamental component of the drain to source voltage and produce a continuous and substantially sinusoidal waveform drive signal at the gate electrode having the proper amplitude and phase to sustain the self-oscillation.

The self-oscillating drive arrangement for the power switch has an inherent narrow bandwidth that is tunable over a wide frequency range. Hence, the frequency of operation of the power converter may be varied for regulation purposes without losing the efficiency advantages of a narrow bandwidth drive. This self-oscillating arrangement is also simpler in construction and has fewer component parts than an equivalent independent drive circuit for the power switch bandwidth.

The converter further includes in accord with the invention a resonant rectifier that positively utilizes leakage and magnetizing inductances of the converter power transformer and its parasitic lead inductances as well as the adjunct capacitances of the rectifier diodes as part of a tuned LC circuit. This tuned circuit shapes the voltage waveform across the diodes to appear substantially as a time reversal of the voltage waveform across the inverter switching device.

In particular the resonant rectifier includes a new and novel circuit arrangement in which the resistive component of the input impedance is controllably shaped to be substantially independent of frequency over the operating range of the converter and to have a controlled dependence on the DC load resistance. This result is achieved in part by utilizing both discrete and adjunct inductance and both discrete and adjunct diode capacitance as controlling circuit elements that are tuned to a specific resonant frequency. This is combined with a shunt resonant circuit at the input of the rectifier. Component values in the resulting circuit can be adjusted to exhibit two predetermined and controlled frequency response poles. An operational range of frequency of the converter falls between these two frequency response poles. Within this range the operation of the rectifier is optimized so that its input resistance is relatively independent of frequency and inversely proportional to the DC load resistance. For a regulated DC output voltage, this load resistance is inversely proportional to output power.

As discussed above, the input impedance of a conventional rectifier tends to vary with frequency of the input signal causing the regulating characteristics to vary with the operating frequency. The input impedance also tends to vary unfavorably with output load in a way that limits the controllable regulation range for a given frequency range of operation of the converter. Hence, by controlling the resistive component of the input impedance so that it is invariant to frequency variations within the normal range of frequency of the converter, a more stable mode of operation is obtained than would be possible with a conventional rectifier in which the input resistance varies with frequency. Furthermore, if the resistive component of the input impedance is controlled to vary inversely with output load resistance, a condition not obtainable with a conventional rectifier, a reduction is achieved in the frequency range needed to obtain a desired regulated power range control. Hence, the benefit of thusly controlling the resistive component of the input impedance of the rectifier becomes immediately apparent.

This converter circuit advantageously utilizes the adjunct reactances of the components in a positive manner as part of the operative converter and that by use of self-oscillation significantly improves the overall efficiency and reduces the overall parts count of the converter. This use of adjunct components permits a practical converter operating at high radio frequencies to be realized using relatively few discrete components.

BRIEF DESCRIPTION OF THE DRAWINGS

An understanding of the invention may be obtained by reference to the following specification and the drawings in which.

DETAILED DESCRIPTION

Figure 1:
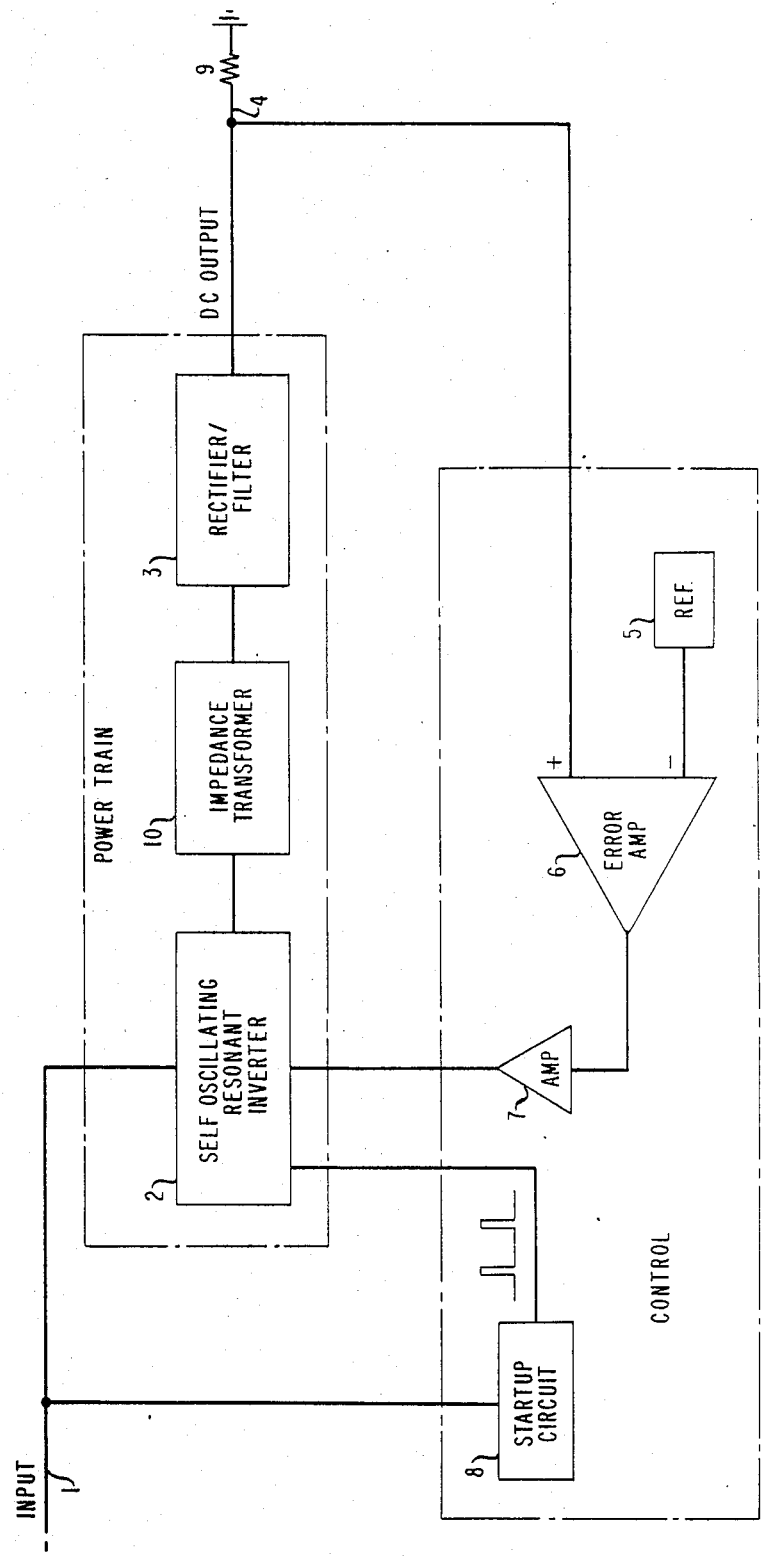
FIG. 1 is a functional block diagram of a high frequency DC-to-DC power converter embodying the principles of the invention.

A high frequency DC-to-DC power converter embodying the principles of the invention is shown functionally in FIG. 1 and comprises a power train circuit including a self-oscillating resonant inverter 2, an impedance transformer 10 and a resonant rectifier/filter network 3. A control circuit including an error amplifier 6 is utilized to supply an error signal for controlling the frequency of inverter 2, and hence, achieve a regulated voltage at output 4. A DC voltage is applied to input terminal 1 and is coupled to a switching device in the inverter 2 and to a start-up circuit 8. The self-oscillating inverter 2 does not self-start, hence the start-up circuit 8 is included to respond to a DC voltage at input 1 and apply a trigger signal to initiate oscillations in the self-oscillating inverter 2. The output of the inverter 2 is coupled to an impedance transformer 10 which, in turn, is connected to a rectifier filter circuit 3. A rectification circuit in the rectifier/filter 3 is operative as described below to have an input resistance that varies inversely with DC output load resistance and is substantially invariant to frequency variations within the operating range of the converter. The rectified output, a DC voltage, is coupled, via lead 4, to a load indicated herein for illustrative purposes as resistive load 9.

The self-oscillating inverter circuit 2 and the transformer 10 include a series L-C circuit into which the transistor power switch operates. The overall power train circuit comprises a tuned network which controls the current and voltage waveform across the power switch of the inverter circuit so that there is minimal overlap during switching transition intervals and thereby, reduced power dissipation during these switching transitions. A complete discussion of a power converter having a similar inverter arrangement and which is driven rather than self-oscillating is disclosed in the aforementioned U.S. Pat. No. 4,449,174 issued to N. G. Ziesse on May 15, 1984 and assigned to the same assignee. This patent discusses the details of the various power train components and their operation and it is not believed necessary to disclose these matters in detail herein.

Figure 2:
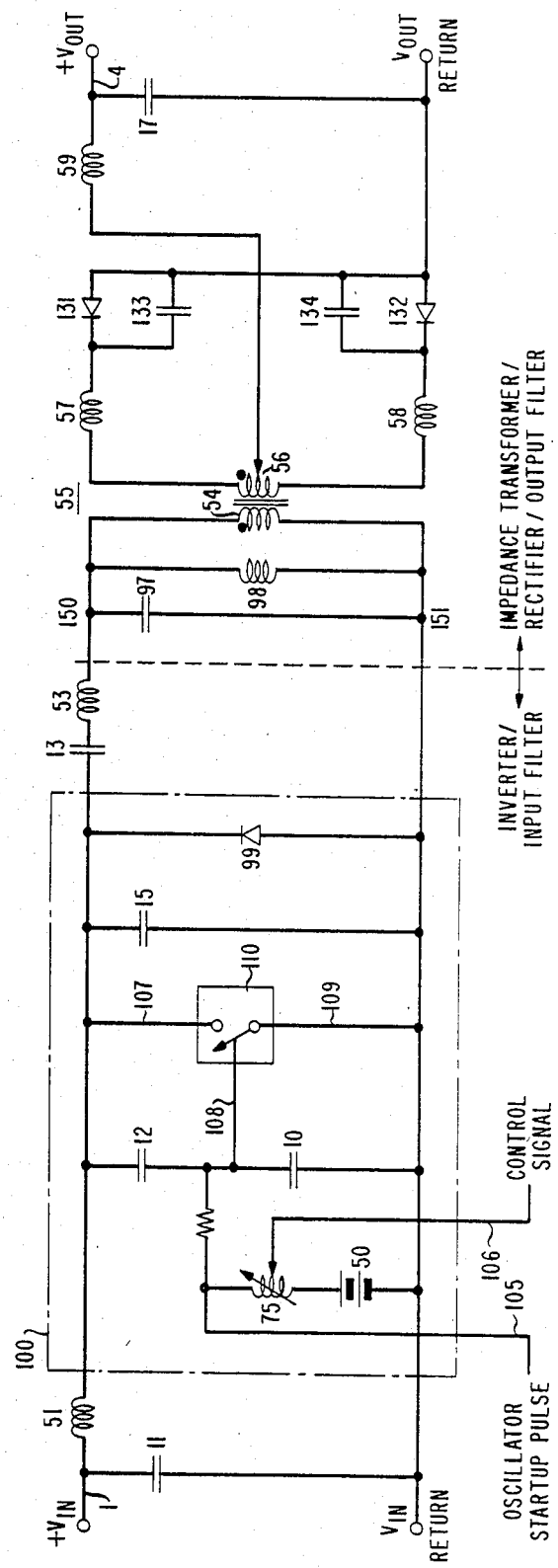
FIG. 2 is a simplified schematic of a self-oscillating power train of the high frequency DC-to-DC power converter.

The power train of the power converter including the self-oscillating inverter is shown in more detail in FIG. 2. DC voltage is applied to input terminal 1 which is coupled to a filter circuit including an RF choke inductor 51 and capacitor 11. The RF choke 51 is coupled to a terminal 107 of a semiconductor power switch 110 shown symbolically as a switch.

The output of the power switch 110 at electrode 107 is coupled into a series tuned LC circuit including capacitor 13 and inductor 53 which in conjunction with the rest of the output network and capacitor 15 constrains the current and voltage waveforms across the power switch 110 to assume certain desired characteristics. These waveforms may be seen in FIG. 4 where waveform 401 represents the voltage waveform across the main power path of the power switch 110. The fundamental sinusoidal component of voltage waveform 401 is shown by waveform 400. The voltage waveform 402 represents the drive signal applied between control terminal 108 and terminal 109 of the power switch 110. This voltage waveform 402 approximates a sinusoidal waveform that contains a DC component 403 supplied as shown by the battery 50 or other DC voltage source. The switch 110 becomes conducting when the waveform 402 exceeds the threshold level 404 of switch 110. It is apparent from these waveforms that current conduction through the power switch 110 (i.e., while waveform 402 is above the threshold level 404) occurs only when there is no voltage drop across the switch 110 (i.e., waveform 401 is substantially zero). The simultaneous existence of substantial current through and voltage across the switch 110 is thus minimized, giving rise to little or no switching loss. The waveform of the current flowing through the series tuned circuit of capacitor 13 and inductor 53 has a quasi sinusoidal shape. The series tuned network of capacitor 13 and inductor 53 is coupled to a resonant rectifier circuit. At the input of the rectifier circuit a shunt tuned network including capacitor 97 and inductor 98 is coupled to the primary winding 54 of an ideal isolating and impedance matching transformer 55. The secondary winding 56 is connected to the rectifying diodes 131 and 132. This resonant rectifier is operative to maintain a substantially constant input resistance over the operating frequency range of the converter as long as the DC load resistance is constant. The rectifier is further arranged to have its input resistance vary inversely with changes in the DC load resistance. This is accomplished by utilizing circuit inductance and capacitance to define two frequency response poles in the rectifier input impedance which bracket the operating frequency range of the converter. These same inductive and capacitive elements are used to perform part of the impedance transformation required in going from the inverter circuit to the rectifier circuit.

Figure 10:
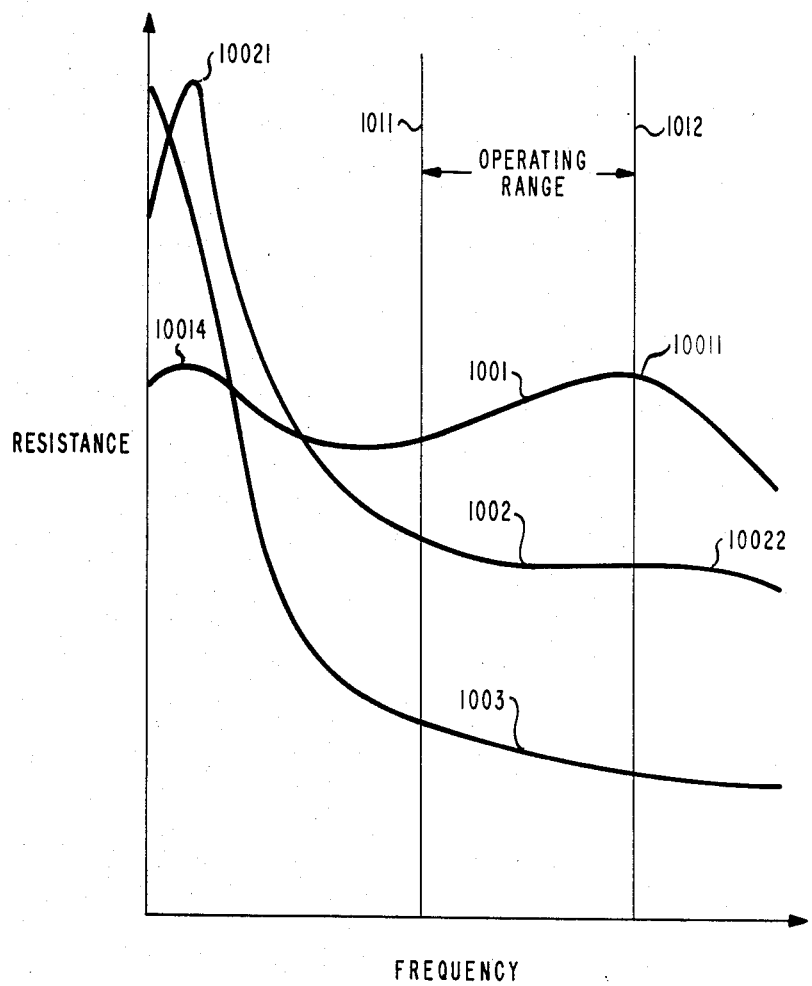
FIG. 10 discloses resistance curves to show the resistive component of the input impedance of the various disclosed resonant rectifiers.

The frequency response of the rectifier is given in FIG. 10, which shows plots of the input resistance of the resonant rectifier as a function of frequency. Curves 1001, 1002, and 1003 represent operation at high, medium and low output power corresponding to low, medium and high DC load resistances, respectively. The operating range bracketed is defined by vertical lines 1011 and 1012 and within this range the input resistance at a given DC load is substantially independent of variations in frequency of the converter. A sharp peak 10021, indicative of a first frequency response pole, is shown to the left of line 1011 in curve 1002. Similarily, curve 1001 includes the peak 10014 indicating a frequency response pole. The existence of a second frequency response pole is indicated by the peak 10011 on the right of line 1012 for the curve 1001. Curve 1002 also includes a peak 10022. It is apparent that the position of these right hand peaks and their associated frequency response poles are highly dependent on the power output of the rectifier. While the two peaks, or maxima, at the two ends of the frequency range are not equally clearly defined on both sides of all the impedance curves and are not equally sharply defined on all the curves, the creation and presence of the frequency response poles which cause the peaks are a necessary prerequisite to the designated operation of the rectifier.

Figure 4:
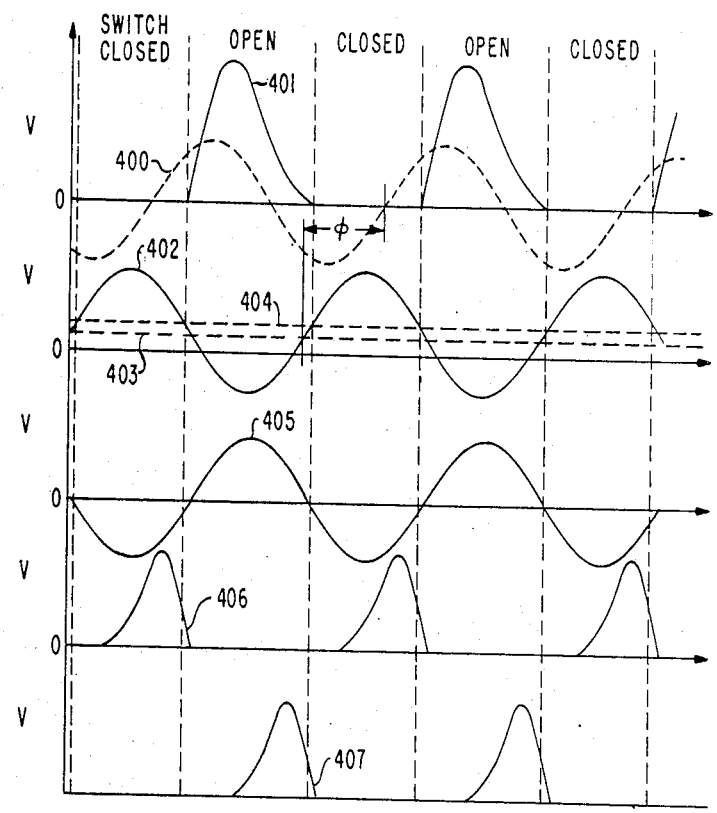
FIG. 4 discloses signal waveforms to assist in describing the operation of the power converter shown in FIGS. 2 and 3.

The poles are defined by the circuit inductances and capacitances, both within and at the input to the rectifier. These include capacitor 97 and inductor 98 shunting the primary 54 of ideal transformer 55. In the rectifier capacitors 133 and 134 are shown shunting each diode. These may be discrete or adjunct capacitances depending upon the diode devices used and the frequency of operation. This combination of circuit elements both defines the poles as, shown in FIG. 10, and shapes the voltages across the diodes as shown in FIG. 4. The voltage waveform across rectifying diode 131 is shown by waveform 406 in FIG. 4, and the waveform 407 represents the voltage waveform across diode 132. These voltage waveforms, as are apparent from FIG. 4, are substantially a time reverse waveform of the voltage waveform 401 appearing across the MOSFET power switch. The rectified output signal is applied to a filter comprising inductor 59 and capacitor 17 supplying a filtered DC voltage to output terminal 4.

The inverse characteristic of the input resistance relative to the DC output load is controlled through LC impedance transformation characteristics contrived to achieve the desired inverse proportionality. This characteristic enhances the regulation effect of a given range of operating frequencies of the converter.

A practical major advantage of the resonant rectifier circuit for high radio frequency operation is that it can utilize to advantage unavoidable parasitic lead inductance and transformer leakage inductance as part or all of the inductors 57 and 58. Furthermore, inductors 57 and 58 in conjunction with the shunt tuned circuit of capacitor 97 and inductor 98 act to make the input impedance of the rectifier as seen between nodes 150 and 151 linear in nature. That is, if the rectifier is driven by a sinusoidal voltage (or current) source, the current (or voltage) is substantially sinusoidal.

A variable inductor 75 is shown with a battery 50 as coupling the power switch control electrode 108 to electrode 109 which is in parallel with capacitance 10. The feedback signal across capacitance 10 and the inductor 75 is a continuous quasi sinusoidal signal shown as waveform 402 in FIG. 4. This signal is phase displaced from the fundamental component 400 of the voltage waveform 401 appearing across power switch 110. This feedback signal shown by waveform 402 is offset by bias voltage supply 50 and applied to the power switch control electrode 108 to drive the power switch 110.

A diode 99 shunting the power switch 110 conducts reverse currents which are present under some conditions of input voltage and output power when the power switch 110 is in its nonconducting or off state. This allows the converter to operate over a wider range of input voltage and output power than if diode 99 were not present.

The switching frequency of the power switch 110 is controlled in part by the value of inductance of the variable inductor 75. The phase displacement shown by $\phi$ in FIG. 4 of the driving waveform 402, normally leads waveform 400 by 120° to nearly 180°. The resonant action of inductor 75 in parallel with capacitance 10 responds through feedback capacitor 12 to the voltage waveform at the main power path electrode 107, which is a periodic unipolar pulselike waveform 401, to produce the substantially sinusoidal drive signal at the control electrode 108 of power switch 110 as shown by waveform 402 in FIG. 4. The inductor 75 is controlled or varied as shown by a signal applied to the control lead 106. This signal applied to lead 106 may be an error signal derived by voltage or current regulation circuitry in response to a deviation of a voltage or current at output lead 4 from a regulated value.

The series L-C circuit comprising capacitor 13 and inductor 53 acting in concert with the shunt tuned circuit comprising capacitor 97 and inductance 98 converts the periodic unipolar signal at the drain electrode 107 into a substantially sinusoidal signal at node 150, which is shown by waveform 405 in FIG. 4. This voltage wave is transmitted through ideal transformer 55 and rectified by the action of the rectifying diodes 131 and 132 each of which produces a voltage signal having a waveform, which as shown by waveforms 406 and 407, with a shape characteristic similar to a time reverse of the voltage waveform at electrode 107 of switch 110. These rectified signals are filtered by a filter circuit including inductor 59 and capacitor 17 and a DC voltage appears at output terminal 4 and across the capacitor 17.

The self-oscillating action of the inverter 100 does not begin automatically when power is applied to the invention, and hence a start-up pulse must be supplied at terminal 105 to initiate the oscillating action of the power inverter 100.

Figure 3:
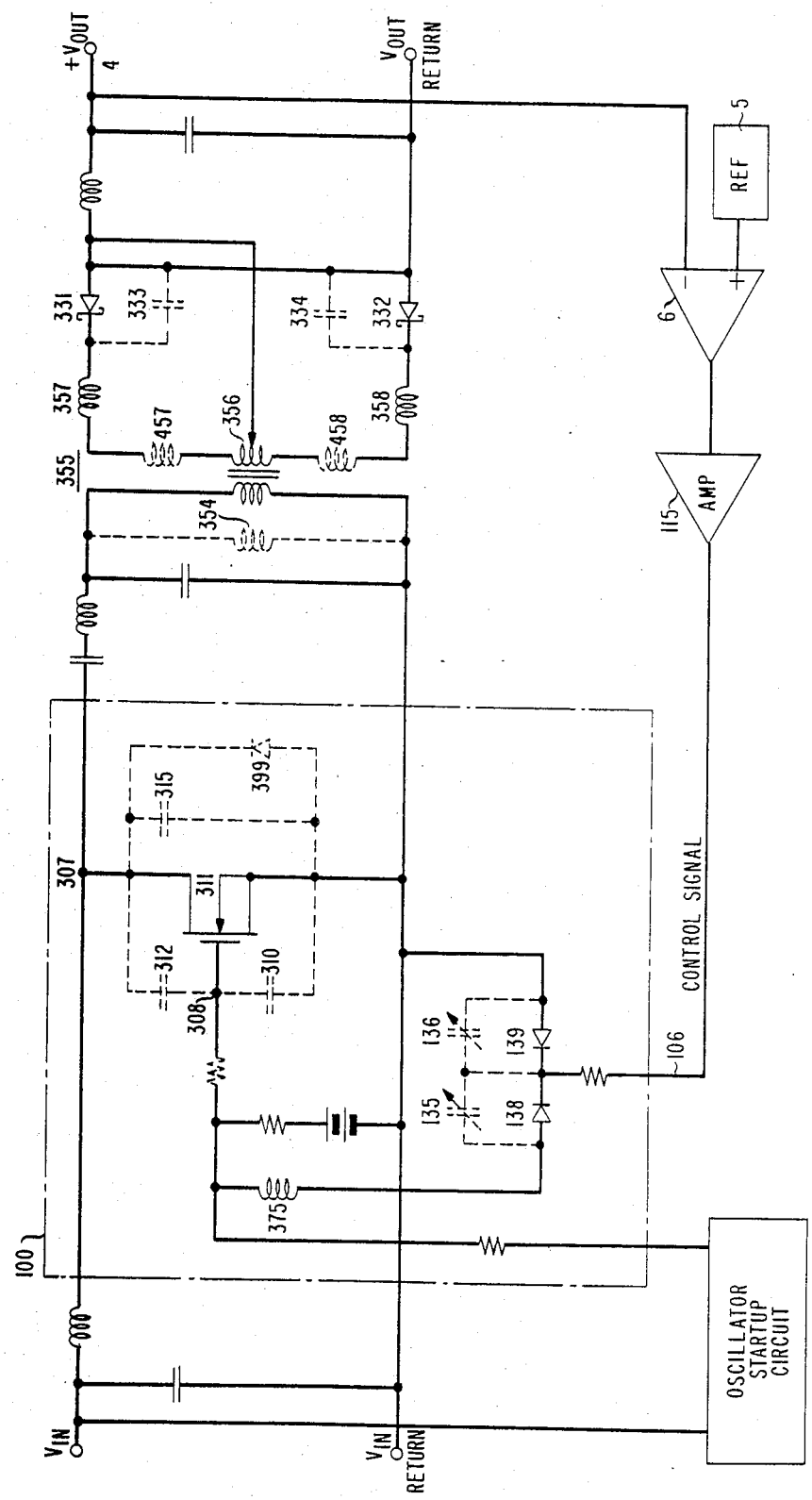
FIG. 3 is a circuit schematic of the power converter including a functional block diagram of a control circuit for voltage regulation and showing the use of adjunct parasitic elements to reduce the number of circuit components at high frequencies.

An embodiment of a self-oscillating power train and associated control and signal processing circuitry to comprise a DC-to-DC converter is disclosed in FIG. 3. This embodiment is suitable for high radio frequency operation. It utilizes the adjunct capacitances of a MOSFET power switch 311 and Shottky rectifier diodes 331 and 332 as converter circuit elements. An inherent body diode 399 of the power MOSFET switch 311 operates to conduct reverse currents through the MOSFET switching device 311 when it is in the off state (that is the channel is not conducting). Furthermore, the magnetizing inductance 354 (shown in dotted line) of the transformer 355 serves to replace shunt inductor 98 (shown in FIG. 2), and the leakage and lead inductances 457 and 458 become dominant portions of the inductors 57 and 58, shown in FIG. 2. Hence, inductors 357 and 358 may be smaller than inductors 57 and 58. This use of adjunct elements provides a unique advantage in that a practical realization of this converter requires few discrete components.

The input and output are coupled by a MOSFET power switch 311 including inherent or adjunct interelectrode capacitances 310, 312 and 315. The drain to gate inherent or adjunct capacitance, shown as capacitor 312, supplies a feedback path from drain electrode 307 to gate electrode 308 sufficient to sustain self-oscillation in the inverter circuit enclosed by dotted line 100 as described below, if the frequency of operation is sufficiently high. At lower frequencies of operation, it may be necessary to add supplementary discrete capacitance. While a MOSFET power switch is shown herein, it is to be understood that other semiconductor power switches may be substituted for the MOSFET and the necessary adjunct elements supplied by discrete devices when needed.

The power converter of FIG. 3 is voltage regulated in response to an error signal supplied by a feedback network at control terminal 106. This error signal is supplied by the output of error signal amplifier 6 which compares the converter's output voltage with a reference voltage level supplied by reference voltage source 5. This error voltage is coupled through amplifier 115 to a junction of two diodes 138 and 139 which are connected in series with the inductor 375 which is, in turn, connected to the gate 308 of power switch 311. The diodes 138 and 139 each have significant nonlinear capacitance as shown by capacitors 135 and 136. The error voltage signal applied to the junction of the two diodes 138 and 139 varies their joint voltage responsive capacitance, and hence, alters the overall inductive reactance of the series connection of inductor 375 and the diodes 138 and 139. The overall series circuit is designed to always have an inductive reactance, and in conjunction with the drain to gate capacitance 310 provides the desired phase shifted feedback signal to the gate electrode 308 for oscillations. By altering the capacitive reactance of the two diodes 138 and 139 with the error signal applied to lead 106 the overall inductive reactance of the feedback network may be controlled to permit variations in the frequency of oscillation of the inverter 100. The variations in frequency in combination with the tuned output network varies the DC output voltage level at lead 4, and hence, through the feedback control circuit achieves voltage regulation.

Figure 5:
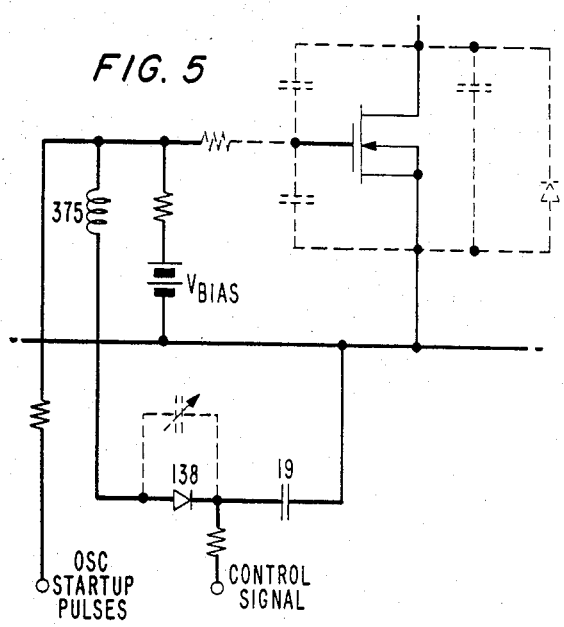
FIGS. 5, 6 and 7 are schematics of alternate self-oscillating power inverter arrangements embodying the principles of the invention.

Another inverter circuit embodiment suitable for application in the power train of the converter is shown in FIG. 5. In this embodiment, the control is applied to a junction of diode 138 and a fixed capacitance 19. The variation of capacitance of diode 138 is sufficient in combination with inductor 375 to achieve the desired reactance range.

Figure 6:
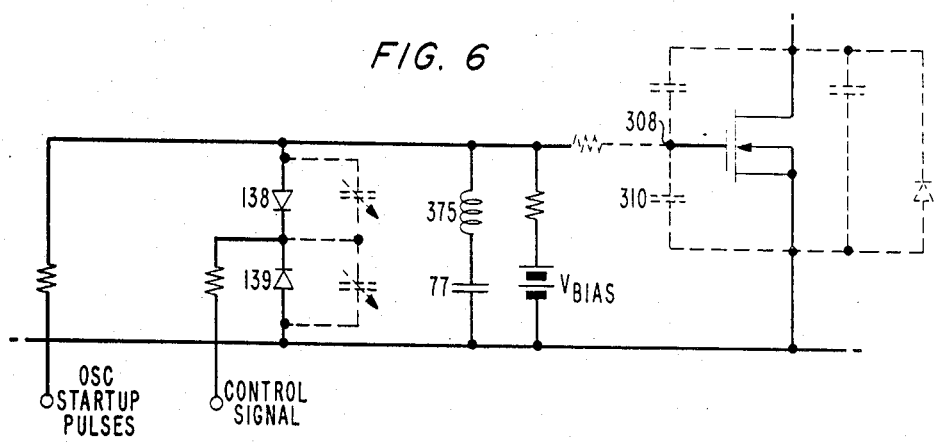
Figure 7:
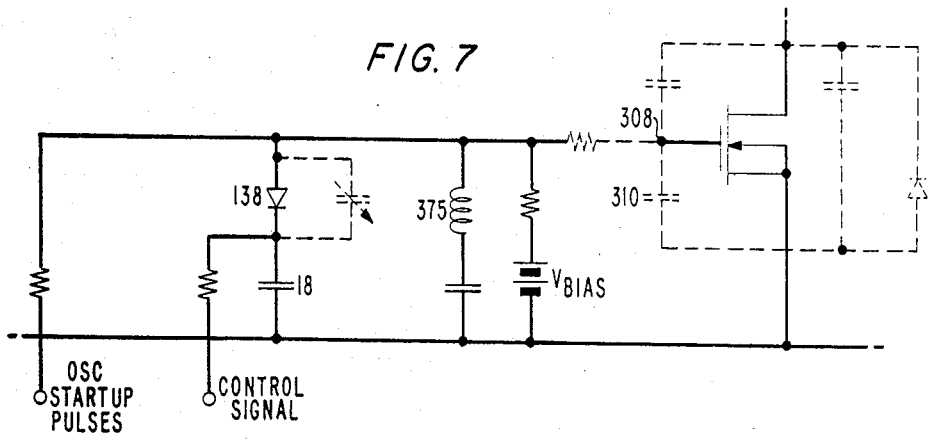

In the inverter circuit embodiment shown in FIG. 6, the control signal is applied to a junction of the series connected diodes 138 and 139. The diodes are connected in shunt with a series connection of inductor 375 and fixed DC blocking capacitor 77. As above, the control signal varies the diode capacitance to alter the overall inductive reactance of the network as presented to gate terminal 308. The inverter embodiment of FIG. 7 applies the control signal to a junction of series connected diode 138 and a fixed capacitor 18. Many additional variations of both the inverter circuit and the power train will be readily apparent to those skilled in the art without departing from the spirit and scope of the invention.

The converter in FIG. 3 includes a fullwave or balanced resonant rectifier comprising Schottky diodes 331 and 332. Shown in dotted lines are two capacitors, 333 and 334, which represent the inherent or adjunct capacitances of diodes 331 and 332, respectively. The secondary lead and transformer leakage inductances shown as inductors 457 and 458 of the secondary winding 356 combined with discrete inductances 357 and 358 and capacitances 333 and 334 form tuned circuits which as described above with reference to FIG. 2 shape the voltage waveforms appearing across the diodes 331 and 332 to approximate a time reversed image of the waveform across the MOSFET power switch 311.

The rectifier circuit has a controlled two pole frequency response so that its input resistance is substantially invariant with respect to frequency changes within the operating range of frequencies of the converter.

The resonant rectifier depicted in FIGS. 2 and 3 is configured as a fullwave or balanced circuit. As such, the voltage waveform applied into the output filter is devoid of the fundamental converter switching frequency and all odd numbered harmonics of this frequency. This can make filtering somewhat easier as the lowest frequency to be filtered is the second harmonic of the switching frequency. To achieve this, however, requires that the secondary winding 56 in FIG. 2 be center tapped, that inductors 57 and 58 be equal in value, and that capacitors 133 and 134 shunting the rectifier diodes 131 and 132 be equal in value.

Figure 8:
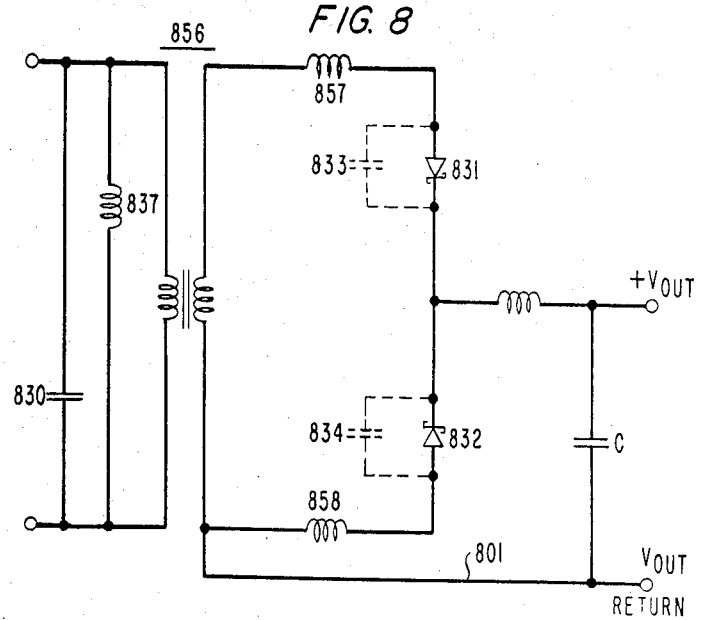
FIGS. 8 and 9 are schematics of alternative resonant rectifying arrangements embodying the principles of the invention.

The advantages of the resonant rectifier may be realized in a number of unbalanced configurations in which the voltage waveform into the output filter contains the switching frequency and all harmonic frequencies. One such embodiment is shown in FIG. 8 in which the return lead 801 is connected to one terminal of the secondary winding 856 as opposed to being connected to a centertap of the secondary winding. Although inductors 857 and 858 may still be equal in value, this is no longer necessary since the requirement for circuit balance has been removed. It is only required that the total loop inductance consisting of the sum of inductance 857, inductance 858, the leakage inductance of transformer 856 as seen on the secondary winding, and any adjunct lead inductance be adjusted to the correct value. The voltage waveforms across diodes 831 and 832 are shaped in the same manner as for the rectifiers shown in FIGS. 2 and 3. Capacitors 833 and 834 should remain equal in value in order that both diodes operate with the same conduction duty ratio and peak reverse voltage. As with the fullwave rectifier of FIGS. 2 and 3 there are four principal circuit elements responsible for correct circuit operation: (1) shunt input capacitor 830, (2) the magnetizing inductance 837 of transformer 856, (3) a combination of shunt diode capacitances 833 and 834, assumed equal, and (4) the total loop inductance including the transformer leakage inductance and inductors 857 and 858. These four elements are available for tuning the circuit to obtain two frequency response poles in the input impedance characteristic. With proper placement of these impedance poles on either side of the operating frequency range and with proper adjustment of their loaded Q's or loss factors, the input resistance of the rectifier becomes substantially independent of frequency within the operating range and inversely proportional to the DC load resistance.

Figure 9:
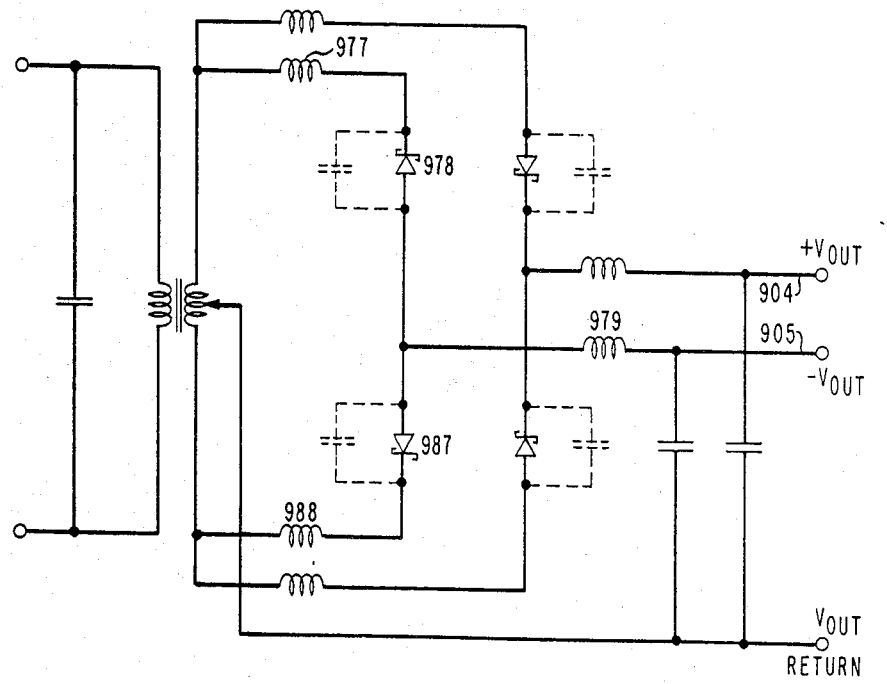

A balanced or fullwave rectifier arrangement for multiple outputs of equal voltage magnitude but opposite polarity is shown in FIG. 9. A positive voltage output appears at lead 904 and a negative voltage output appears at lead 905. The negative output section utilizes added inductors 977 and 988, diodes 978 and 987 and output filter inductor 979. This arrangement also utilizes both discrete and adjunct reactances to shape the voltage waveform across the diodes 978 and 987 in the same way as was described for the circuit in FIG. 3. Although this rectifier contains more elements than the single output rectifier, and therefore in theory contains more than two poles in the input impedance characteristic, the input resistance may nevertheless be made substantially independent of frequency over the operating range.

Figure 11:
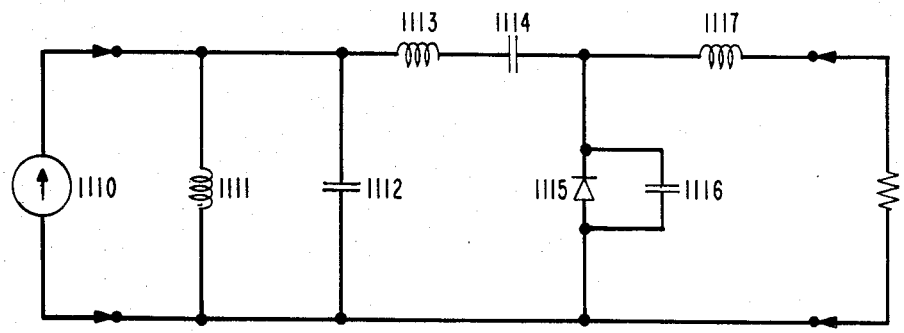
FIGS. 11, 12, 13, 14 and 15 are schematics of further resonant rectifying arrangements embodying the principles of the invention.

While the rectifiers in FIGS. 2, 3, 8, and 9 are depicted with transformers to provide isolation between input and output and to provide impedance transformation when necessary, the unbalanced versions, that is, those not requiring a center-tapped secondary winding, may be realized without the transformer. One such circuit employing a single rectifier diode 1115 and driven by a sinusoidal current source 1110 is shown in FIG. 11. Shunt input capacitor 1112 and input inductor 1111 together with inductor 1113 and capacitor 1116 which shunts the diode are the elements used to tune the circuit for proper operation. Capacitor 1114 has a large value of capacitance and is for DC blocking only. This capacitor does not participate in circuit tuning. Inductor 1117 is an RF choke inductor and also does not participate in the circuit tuning.

Figure 12:
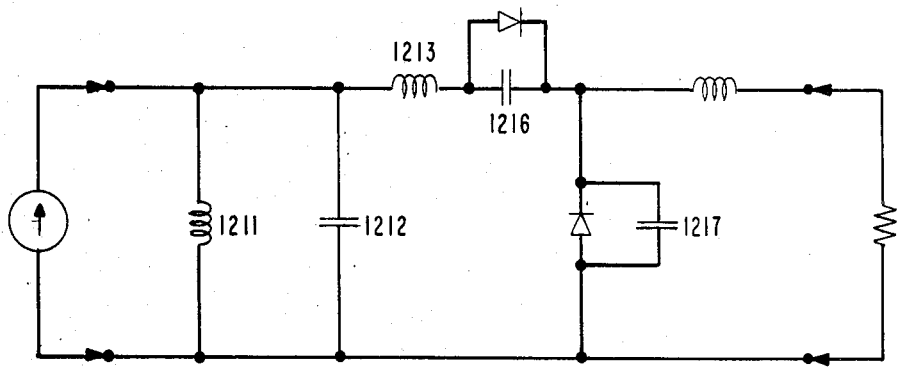

A two-diode version of the circuit which does not require the DC blocking capacitor appears in FIG. 12. Tuning for the proper input resistance characteristic is accomplished in a manner identical with that of the other circuits. As with the other two-diode circuits, it is desirable that shunt diode capacitances 1216 and 1217 be equal in value in order that both diodes experience the same conduction duty ratio and peak reverse voltage. Inductor 1218 is an RF choke. Inductors 1211 and 1213 and capacitor 1212 are considered in circuit tuning.

Figure 13:
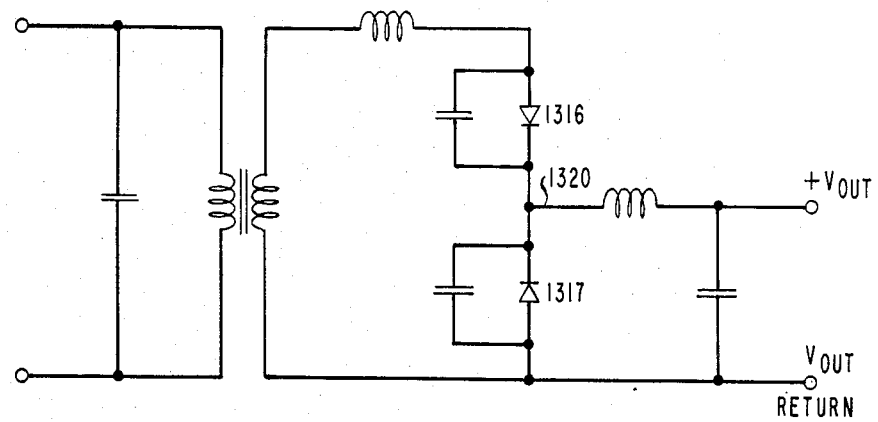
Figure 14:
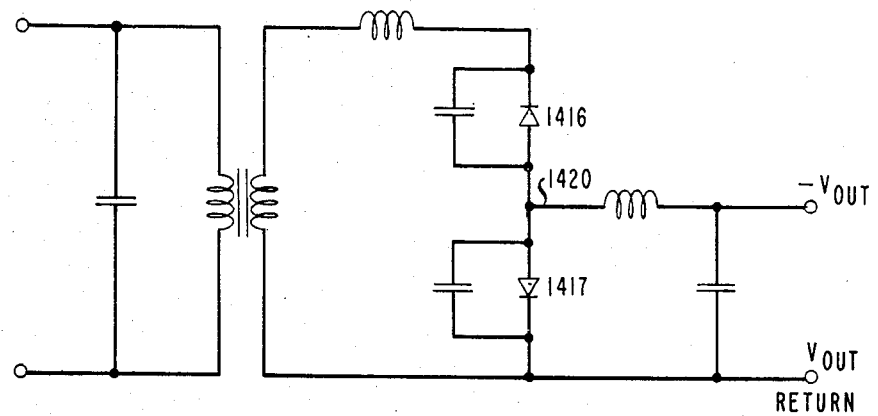
Figure 15:
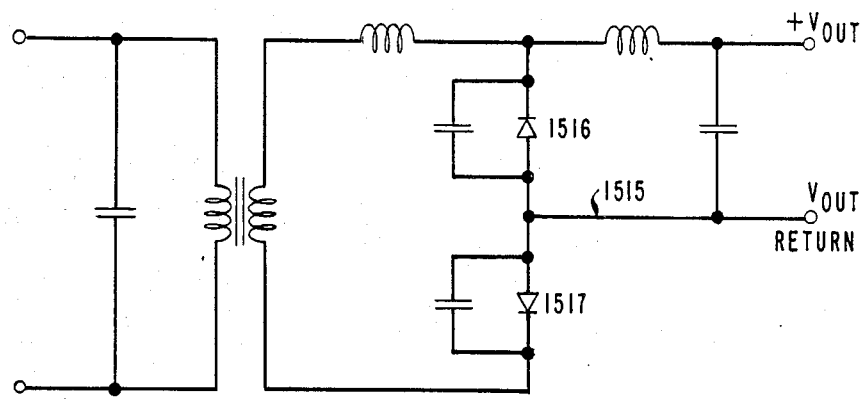

In all of the rectifier circuits disclosed the polarity of the output voltage may be reversed by reversing the diode polarity without altering the principles of circuit operation. FIGS. 13 and 14 illustrate this effect with two circuits that are identical except for the diode polarities of rectifying diodes 1316 and 1317 and 1416 and 1417, respectively. Furthermore, as FIGS. 13 and 15 illustrate, the DC output may be extracted from the rectifier in a number of different ways, so long as every possible DC path between the output terminals of the selected circuit contains a diode. As shown in FIG. 15 the return path 1515 connects to a common node of diodes 1516 and 1517. In contrast the common nodes of the rectifying diodes 1316, 1317 and 1416, 1417 are connected to an output path 1320, 1420, respectively.

What is claimed is:

1. A power rectifying circuit comprising:
   an input for accepting a high frequency, substantially sinusoidal signal lying within a predefined operating frequency range,
   an output for accepting a load to be energized,
   a first inductance associated with the input,
   a first capacitance associated with the input,
   a network, including a rectifying diode coupling the input to the output, the diode including significant adjunct capacitance,
   a second inductance included within the network,
   a second capacitance included within the network and including the adjunct capacitance,
   the first and second capacitance and the first and second inductance being tuned to obtain first and second frequency response poles in an impedance of the input selected such that the first and second frequency response poles are bracketing a predefined frequency range of the sinusoidal signal and further having network quality adjusted so that a resistive component of impedance at the input is substantially invariant with respect to frequency variations of the high frequency signal over the predefined operating frequency range.

2. A power rectifying circuit comprising:
   an input for accepting a high frequency, substantially sinusoidal signal lying within a predefined operating frequency range,
   an output for accepting a load to be energized,
   a first inductance associated with the input,
   a first capacitance associated with the input,
   a network, including a rectifying diode coupling the input to the output, the diode including significant adjunct capacitance,
   a second inductance included within the network,
   a second capacitance included within the network and including the adjunct capacitance,
   the first and second capacitance and the first and second inductance being tuned and adapted to achieve a network quality adjusted to provide an LC impedance transformation between the input and output so that a resistive component of impedance of the input varies inversely with a change of a resistance value of the load.

3. A power rectifying circuit comprising:
   an input for accepting a high frequency, substantially sinusoidal signal lying within a predefined operating frequency range,
   an output for accepting a load to be energized,
   a first inductance associated with the input,
   a first capacitance associated with the input,
   a network including a rectifying diode coupling the input to the output, the rectifying diode including significant adjunct capacitance,
   a second inductance included within the network,
   a second capacitance included within the network and including the adjunct capacitance,
   the first and second capacitance and the first and second inductance being tuned to obtain first and second frequency response poles in an impedance of the input selected such that the first and second frequency response poles are bracketing a predefined operating frequency range of the sinusoidal signal so that a resistive component of impedance at the input is substantially invariant with respect to frequency variations of the high frequency signal over a predetermined operating frequency range, and further having a network quality adjusted so that an LC impedance transformation between the input and output assures that a resistive impedance of the input varies inversely with a change of a resistance value of the load.

4. A power rectifying circuit as defined in claims 1, 2, or 3 wherein the input includes a transformer.

5. A power rectifying circuit as defined in claim 4 wherein the second inductance includes a leakage inductance of the transformer.

6. A power rectifying circuit as defined in claim 4 wherein the first inductance includes a magnetizing inductance of the transformer.

7. A power rectifying circuit as defined in claim 4 wherein the first inductance includes a magnetizing inductance of the transformer and the second inductance includes a leakage inductance of the transformer.

8. A power rectifying circuit as defined in claim 1, 2, or 3 and further including means for filtering a rectified signal to obtain a substantially DC output.

9. A power rectifying circuit as defined in claim 1, 2, or 3 wherein the network includes a second rectifying diode having significant adjunct capacitance and being connected to conduct alternately with the first rectifying diode.

10. A power rectifying circuit as defined in claim 1, 2, or 3 wherein the second capacitance includes a discrete capacitance shunting the rectifying diode.

11. A power rectifying circuit for a power converter circuit having an inverter circuit generating a substantially sinusoidal signal and an energy transfer between the inverter and the rectifying circuit being substantially at a single frequency lying within a defined regulatory frequency range, comprising:
    an input for accepting a substantially sinusoidal signal,
    an output for supplying a load,
    a rectifying diode located intermediate to the input and output,
    a first inductive reactance at the input,
    a first capacitive reactance at the input,
    a second inductive reactance within the rectifying circuit, a second capacitive reactance including adjunct capacitance of the rectifying diode within the rectifying circuit, the first and second inductive reactance and the first and second capacitive reactance being tuned to establish first and second frequency response poles in an impedance of the input,
    the first and second frequency response poles selected to bracket the defined regulatory frequency range whereby a resistive component of impedance at the input is substantially invariant to frequency change within the defined regulatory frequency range.

12. A power rectifying circuit for a power converter circuit having an inverter circuit generating a substantially sinusoidal signal and an energy transfer between the inverter and the power rectifying circuit being substantially at a single frequency lying within a defined regulatory frequency range, comprising:
an input for accepting a substantially sinusoidal signal,
an output for supplying a load,
a rectifying diode located intermediate to the input and output,
a first inductive reactance at the input,
a first capacitive reactance at the input,
a second inductive reactance within the rectifying circuit, a second capacitive reactance including adjunct capacitance of the rectifying diode within the rectifying circuit, the first and second inductive reactance and the first and second capacitive reactance being selected for providing an LC impedance transformation between the input and the output such that a resistive component of impedance at the input varies inversely with a load resistance at the output.

13. A power rectifying circuit for a power converter circuit having an inverter circuit generating a substantially sinusoidal signal and an energy transfer between the inverter and the power rectifying circuit being substantially at a single frequency within a defined regulatory frequency range, comprising:
an input for accepting a substantially sinusoidal signal,
an output for supplying a load,
a rectifying diode located intermediate to the input and output,
a first inductive reactance at the input,
a first capacitive reactance at the input,
a second inductive reactance within the rectifying circuit, a second capacitive reactance including adjunct capacitance of the rectifying diode within the rectifying circuit, the first and second inductive reactances and the first and second capacitive reactances being tuned to establish first and second frequency response poles in an impedance of the input,
the first and second frequency response poles selected to bracket the defined regulatory frequency range whereby a resistive component of impedance at the input is substantially invariant to frequency change within the defined regulatory frequency range, and a circuit quality of the power rectifier further being adapted for providing LC impedance transformation between the input and the output such that a resistive component of impedance at the input varies inversely with load resistance at the output.

14. A power rectifying circuit as defined in claims 11, 12, or 13 wherein the input includes a transformer.

15. A power rectifying circuit as defined in claim 14 wherein the first inductive reactance includes a magnetizing inductance of the transformer.

16. A power rectifying circuit as defined in claim 14 wherein the second inductive reactance includes a leakage inductance of the transformer.

17. A power rectifying circuit as defined in claim 14 wherein the first inductive reactance includes a magnetizing inductance of the transformer, and the second inductive reactance includes a leakage inductance of the transformer.

18. A power rectifying circuit as defined in claim 11, 12 or 13 wherein the second capacitive reactance includes a discrete capacitor shunting the rectifying diode.

19. A rectifying circuit as defined in claim 11, 12 or 13 and further including a second rectifying diode including significant adjunct capacitance and connected to conduct alternately with the first rectifying diode.

20. A power rectifying circuit as defined in claim 11, 12, or 13 and further including means for filtering a rectified signal to obtain a substantially DC output.

* * * * *